June 17, 1941.  F. W. HANKS  2,246,250
METER CONSTRUCTION
Filed March 30, 1938
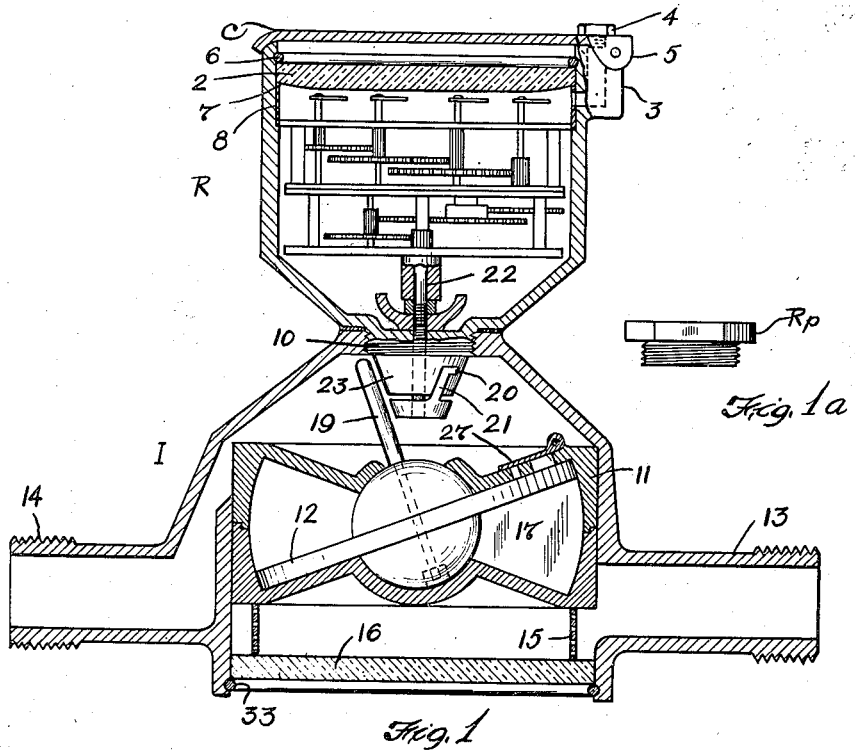
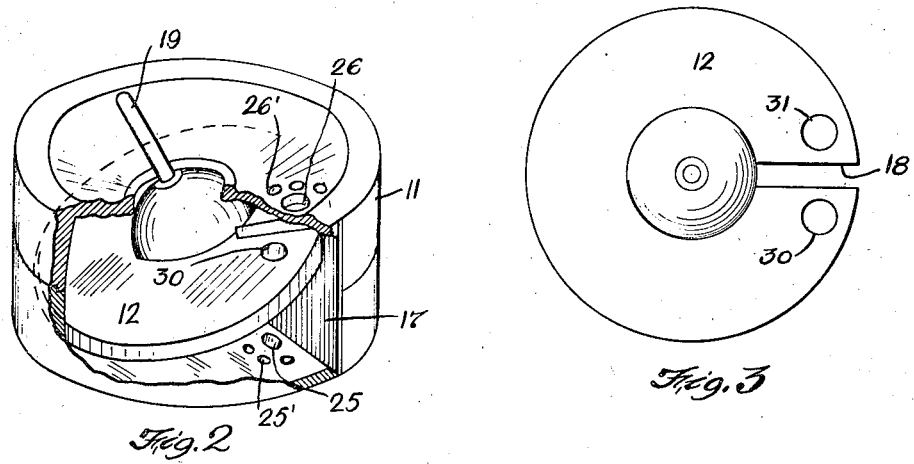
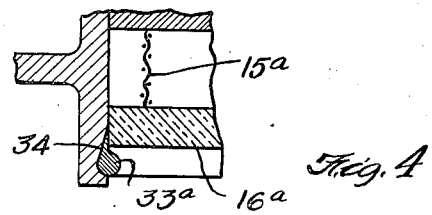
INVENTOR.
Frederick W. Hanks
BY Ray, Oberlin & Ray
ATTORNEYS.

Patented June 17, 1941

2,246,250

UNITED STATES PATENT OFFICE 2,246,250

METER CONSTRUCTION

Frederick W. Hanks, Cleveland, Ohio

Application March 30, 1938, Serial No. 198,924

14 Claims. (Cl. 73—258)

This invention relates to meters, and more particularly fluid meters; and it is among the objects of the invention to provide a sensitive and protected meter having provision of compensation for easing the unbalance of actuating pressure on the fluid-impelled element, thereby lessening warpage and breakage of such element and allowing a lighter arrangement more sensitive on small stream; and having construction which is particularly leak-proof and tamper-proof.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing—

Fig. 1 is a vertical sectional view showing an embodiment of the invention; Fig. 1a is a side elevational view of a closure element adaptable to the lower or fluid-impeller section of the casing; Fig. 2 is a perspective view of the metering disc and its enclosing housing, the latter being partly broken away; Fig. 3 is a plan view of a meter disc or fluid-impelled element; and Fig. 4 is a sectional detail of a modification.

The entire mechanism is enclosed in a casing, which is in two sections or parts conveniently, the lower section I enclosing the fluid-impelled metering portion of the mechanism, and the upper section R enclosing the registering mechanism. The latter section is provided with a closure over the registering dial, and a suitably thick glass plate 2 in such relation allows viewing of the register hands, while also permitting a fluid-tight joint thereover. Desirably, the glass 2 may be slightly convexed inwardly, so as to divert any bubbles which might occur, and by means of a spout 3 with closure plug 4, such portion of the device may receive a filling of non-freezing liquid, as for instance oil, where desired. As a particular refinement the spout 3 may also combine the function of hinge-member on one side of which the hinge-member 5 of the cover c is hinged. For holding the cover glass disc and completing the sealing, an annular holding ring 6 is arranged thereagainst, while a gasket ring 7, as of rubber, etc., and a spacing ring 8 may be under the glass. Preferably, the holding ring 6 is secured to casing section R in a substantially integral manner, and for this I may join the ring to the surrounding portion of the section R. Thus, where the casing is made of metal, the metal holding ring 6 may be of solder or of metal soldered to the casing R. This being more yielding or weaker than the metal of the casing, in event of pressure internally which is higher than that predetermined for a proper working maximum, the holding ring 6 will simply push out or shear through. Advantageously, the shearable metal may be positioned in a groove provided in the apposed portion of the casing. In some instances the holding ring 6 may be of rubber capable of being squeezed into place in the groove, these to hold tightly until sheared by an excess pressure within. Where the casing and holding ring are made of non-metallic material, as for instance molded composition, synthetic resin, etc., again the holding ring may be held and sealed to the casing as afore-indicated, by a shearable uniting material, as composition, resin, or the like. And in any case, the structure at such point is in effect integral across, without joints to leak, but at the same time damage to the mechanism thereunder is prevented by reason of the fact that the closure can yield or shear through the uniting material in event of an excess strain.

Desirably, the registering section R and the impeller section I are joined by a screw-threaded joint 10, facilitating manufacture, and assembly, and repairs. By means of an auxiliary closure plug Rp, Fig. 1a, if for any reason in emergency it is desired to remove the register section R while still leaving the impeller section I intact on the line, this may readily be done, it being merely necessary to turn off the flow long enough to unscrew the register section and remove it and put in the plug Rp, whereupon the flow may be restored until such time as replacement and repair can be completed. A minimum of interruption of service is thereby possible.

The metering section of the casing I encloses the fluid-impelled element, and this may be of any usual or preferred type. For illustration, I have shown an impeller housing 11 with a nutating disc type of impeller 12, the impeller housing being mounted within the casing I so as to be between the fluid inlet connection 13 and the outlet connection 14. Preferably, a strainer or suitably finely perforated guard is interposed between the inlet and the impeller housing, and if this be in the form of an annulus 15, particularly convenient mounting may be had, by setting it between the end of the cylindrical impeller housing 11 and the closure plate 16 of the casing, the strainer annulus thus lying across the inlet. With a nutating disc type of impeller, the housing 11 has a radial partition 17 provided between the inlet and the outlet of the housing chamber, and the disc has a slot 18 which operates on the partition 17 as the disc nutates on its hemispherical bearing portions, the gyrating spindle 19 engaging through proper connections, in a form in gereral well known, to the register gearing and indicator. However, I prefer to provide a lateral thrust head 20 on the arm 21 of the shaft 22 which transmits the rotary motion to the gearing. Also I prefer to make the guide or control 23 of glass, as I have found that this surprisingly lowers the friction of the spindle 19 traveling around thereagainst, and increases the sensitivity of the instrument.

The inlet communication to the impeller housing is an opening 25, Fig. 2, in the end wall of the cylindrical housing, and the outlet is a similar opening 26 in the other end of the housing, and at the opposite side of the partition 17. I prefer to also add several smaller auxiliary openings 25', 26' at the inlet and outlet, as I find that this facilitates equalization of flow of the liquid through variations in range of velocity-rush. As readily seen, the inlet openings 25, 25', are in communication with and adjacent the connection 13 of the casing, and the outlet openings 26, 26', are in communication with the outlet connection 14. Preferably, a back-flow check valve, such as a simple flap valve 27 is provided over the outlet openings 26, 26'.

The impeller element itself is provided with an opening 30 for the inlet side and an outlet opening 31, these openings permitting a portion of fluid to pass, thereby partly easing the pressure upon the impeller, while leaving a sufficiency to propel the element. Instead then of having to sustain an unnecessary differential of pressure, the impeller is subjected to merely a propelling rate, and the feed through the compensating openings 30, 31 being proportional to the fluid pressure, there is a proper propulsion without necessity of building the propeller so massively as to sustain the possible top maximum pressure unbalance to which it might be subjected. A thinner and lighter impeller is thus had.

The bottom of the casing is closed by a plate 16, as already indicated, and this is sealed to the casing substantially integrally also. Where the casing is of metal, the closure disc 16 may be held and sealed by metal which is sufficiently yieldable to shear at the point of juncture. Thus, as for ring 6 above-described, a softer metal, such as soft solder may provide the sealing means 33. Or, the ring may be of rubber squeezed and lodged in position in the groove in the apposing portion of the casing 1. And likewise, where the casing is made of a molded composition, synthetic resin, etc., again the sealing and holding means 33, integral in effect, may be of composition, resin, etc., of more yielding or shearable character.

The grooves receiving the holding means 6 or 33 may have a cross-section shape of a half-circle or more or less, as preferred in any case. In some instances, using rubber as the retainer a bevel 34, Fig. 4, may advantageously extend inwardly from the groove so as to permit of the rubber ring 33a being of slightly wedge-shaped cross-section and pressure within will initially wedge the cover more tightly. The strainer ring 15a may be slightly resilient and be somewhat compressed in the placement of the closure plate 16a such as to exert some reactive pressure subsequently against the plate.

It having been seen that a compensated pressure arrangement particularly facilitates application of a lighter construction without risk of breakage, I prefer to make the fluid metering element 12 of such a material as soap stone, and for example the form thereof known commercially as "lava," soap stone or talc being found to result in surprising advantages, resulting in very much lessened friction with the contacting surfaces, besides being more heat-resistant, a matter which is particularly desirable in some instances. The member may be made entirely of the soap stone or talc rock, or only separate portions thereof, as the disc or the hemispheres, as preferred in any given case. A self-lubricating action in service is thus had, together with great durability.

With a construction as seen, it is readily apparent that the device is closed fluid-tight, and is correspondingly guarded against leakage at joints, the complete device presenting in effect only one joint, viz: that at the screw-threaded junction 10, but this being of screw-threaded type, is as durable as anything on the line. However, if at any time an excess of pressure be imposed, as for instance in event of freezing, the closures simply push out, the sealing being sheared through, and damage to the delicate mechanism is avoided. Moreover, when for any reason it is desired to open the casing, this may very easily be done by putting fluid pressure into the casing in sufficient amount to push out the plate, shearing the sealing and holding means. Withall, a particularly light construction of impeller is applicable, in contrast to the massive structure familiar to the art, and a more sensitive and accurately operating device also results. It will be observed that the impeller housing illustrated does not have the inlet and outlet opening laterally in the cylindrical surface of the housing chamber as heretofore familiar in devices of this general character, but the openings are in the ends. The interior wall of chamber 11 being evenly cylindrical throughout, an important manufacturing advantage accrues, in that this portion of the device may be machined accurately internally very expeditiously by means of a milling tool or reamer, the wall being brought into particularly accurate circular surfacing, as was not possible with former constructions. On placement of the radial partition 17, then, the housing is finished with a minimum of effort and expense.

Other modes of applying the principle of the invention may be employed, change being made as regards the details described, provided the features stated in any of the following claims, or the equivalent of such, be employed.

I therefore particularly point out and distinctly claim as my invention:

1. A fluid meter, comprising a casing in sections including a section enclosing registering mechanism and a section for enclosing a fluid-impelled metering disc, a screw-threaded joint between the sections, a closure over the registering section, a peripheral groove in the apposed portion of said last-named section adjacent said closure, strain-yieldable soft metal solder in said groove for maintaining said closure in position, a cylindrical metering housing around the metering disc and positioned in said metering casing section, inlet and outlet connections for said latter section, a spindle projecting from the metering disc, a glass guide on which said spindle moves, and an arm and shaft revolved by said spindle to rotate the registering mechanism, said arm having a thrust-head extension, an annular strainer seated with one edge against the housing of said disc and guarding the inlet of the metering casing, inlet-port holes in the end wall of the disc housing which is toward the inlet of the metering casing, outlet-port holes in the other end wall of the disc housing, a radial partition in said housing separating said inlet and outlet-port holes, said metering disc having a slot to ride said partition, a pressure compensating opening through the disc on each side of said partition, a closure for the metering section of the casing, a peripheral groove in the apposed portion of the metering section adjacent said closure, and strain-yieldable soft solder in said groove for maintaining said closure in position.

2. A fluid meter, comprising a casing in sections including a section for registering mechanism and a section for a fluid-impelled metering disc, a screw-threaded joint between the sections, a closure over the registering section, a peripheral groove about said closure in the apposed portion of said last-named section, strain-yieldable soft metal solder in said groove for maintaining said closure in position, a cylindrical metering housing around the metering disc and positioned in said metering casing section, inlet and outlet connections for said latter section, inlet-port holes in the end wall of the disc housing which is toward the inlet of the metering casing, outlet-port holes in the other end wall of the disc housing, a radial partition in said housing separating said inlet and outlet-port holes, the metering disc having a slot to ride said partition, a pressure compensating opening through the disc on each side of said partition, a closure for the metering section of the casing, a peripheral groove about said closure in the apposed portion of the metering section, and strain-yieldable soft solder in said last named groove for maintaining said closure in position.

3. A fluid meter, comprising a casing in sections including a section for registering mechanism and a section for a fluid-impelled metering disc, a screw-threaded joint between the sections, a closure over the registering section, a peripheral groove about said closure in the apposed portion of said last-named section, strain-yieldable sealing in said groove for maintaining said closure in position, a cylindrical metering housing around the metering disc and positioned in said metering casing section, inlet and outlet connections for said latter section, an annular strainer seated with one edge against the housing of said disc and guarding the inlet of the metering casing, inlet-port holes in the end wall of the disc housing which is toward the inlet of the metering casing, outlet-port holes in the other end wall of the disc housing, a radial partition in said housing separating said inlet and outlet-port holes, the metering disc having a slot to ride said partition, a pressure compensating opening through the disc on each side of said partition, a closure for the metering section of the casing, a peripheral groove about said closure in the apposed portion of the metering section, and strain-yieldable soft solder in said last named groove for maintaining said closure in position.

4. A fluid meter, comprising a casing in sections including a section for registering mechanism and a section for a fluid-impelled metering disc, a screw-threaded joint between the sections, a closure over the registering section, a peripheral groove about said closure in the apposed portion of said last-named section, strain-yieldable sealing in said groove holding said closure in position, a cylindrical housing around the metering disc and positioned in said metering casing section, inlet and outlet connections for said latter section, inlet-port holes in the end wall of the disc housing which is toward the inlet of the metering casing, outlet-port holes in the other end wall of the disc housing, a radial partition in said housing separating said inlet and outlet-port holes, the metering disc having a slot to ride said partition, a pressure compensating opening through the disc on each side of said partition, a closure for the metering section of the casing, a peripheral groove about said closure in the apposed portion of the metering section, and strain-yieldable soft solder in said last-named groove for maintaining said closure in position.

5. A fluid meter, comprising a casing in sections including a section for registering mechanism and a section for a fluid-impelled metering disc, a screw-threaded joint between the sections, a closure over the registering section, a peripheral groove about said closure in the apposed portion of said last-named section, strain-yieldable sealing in said groove holding said closure in position, a cylindrical housing around the metering disc and positioned in said metering casing section, inlet and outlet connections for said latter section, inlet-port holes in the end wall of the disc housing which is toward the inlet of the metering casing, outlet-port holes in the other end wall of the disc housing, a radial partition in said housing separating said inlet and outlet-port holes, the metering disc having a slot to ride said partition, a pressure compensating opening through the disc on each side of said partition, a closure for the metering section of the casing, a peripheral groove about said closure in the apposed portion of the metering section, and strain-yieldable soft metal sealing said last-named groove for maintaining said closure in position.

6. A fluid meter, comprising a casing in sections including a section for registering mechanism and a section for a fluid-impelled metering disc, a screw-threaded joint between the sections, a closure over the registering section, a peripheral groove about said closure in the apposed portion of said last-named section, strain-yieldable sealing in said groove holding said closure in position, a cylindrical housing around the metering disc and positioned in said metering casing section, inlet and outlet connections for said latter section, inlet-port holes in the end wall of the disc housing which is toward the inlet of the metering casing, outlet-port holes in the other end wall of the disc housing, a radial partition in said housing separating said inlet and outlet-port holes, the metering disc having a slot to ride said partition, a pressure compensating opening through the disc on each side of said partition, a closure for the metering section of the casing, a peripheral groove about said closure in the apposed portion of the metering section, and strain-yieldable sealing material in said last-named groove for holding said closure in position.

7. A fluid meter, comprising a casing in sections including a section for registering mechanism and a section for a fluid-impelled metering disc, a screw-threaded joint between the sections, a closure over the registering section, a peripheral groove about said closure in the apposed portion of said last-named section, strain-yieldable sealing in said groove holding said closure to the apposed portion of said registering section of the casing, a cylindrical housing around the metering disc and positioned in said metering casing section, inlet and outlet connections for said latter section, inlet-port holes in the end wall of the disc housing which is toward the inlet of the metering casing, outlet-port holes in the other end wall of the disc housing, a radial partition in said housing separating said inlet and outlet-port holes, the metering disc having a slot to ride said partition, a pressure compensating opening through the disc on each side of said partition, a closure for the metering section of the casing, and strain-yieldable sealing material holding said last named closure in position.

8. A fluid meter, comprising a casing in sections including a section for registering mechanism and a section for a fluid-impelled metering disc, a screw-threaded joint between the sections, a closure over the registering section, a peripheral groove about said closure in the apposed section and strain-yieldable sealing in said groove holding said closure to the apposed portion of said registering section of the casing, a cylindrical housing around the metering disc and positioned in said metering casing section, inlet and outlet connections for said latter section, inlet-port holes in the end wall of the disc housing, outlet-port holes in the other end wall of the disc housing, pressure compensating openings through the metering disc, a closure for the metering section of the casing, and strain-yieldable sealing material holding said last-named closure in position.

9. A fluid meter, comprising a casing in sections including a section for registering mechanism and a section for a fluid-impelled metering element, a screw-threaded joint between the sections, a closure over the registering section, strain-yieldable sealing material holding said closure, a metering chamber in said metering section, inlet and outlet-ports communicating with said chamber, a fluid-impelled element in said chamber, pressure compensating openings in said fluid-impelled element, a closure for the metering section of the casing, and strain-yieldable sealing material holding said last-named closure.

10. A fluid meter, comprising a casing in sections including a section for registering mechanism and a section for a fluid-impelled metering element, a closure over the registering section, strain-yieldable sealing material holding said closure, a metering chamber in said metering section, inlet and outlet-ports communicating with said chamber, a fluid-impelled element in said chamber, pressure compensating openings in said fluid-impelled element, a closure for the metering section of the casing, and strain-yieldable sealing material holding said last-named closure.

11. A fluid meter, comprising a casing in sections including a section for registering mechanism and a section for a fluid-impelled metering element, a closure over the registering section, a peripheral groove about said closure in the apposed section of said last-named section, strain-yieldable soft solder in said groove, a closure for the metering section of the casing, a peripheral groove about said closure in the apposed portion of the metering section, and strain-yieldable soft solder in said last-named groove.

12. A fluid meter, comprising a casing in sections including a section for a fluid-impelled metering element, a closure for said casing, a peripheral groove about said closure in the apposed portion of the casing, strain-yieldable soft solder in said groove maintaining said closure in position and also forming a sealing element.

13. A fluid meter, comprising a casing, registering mechanism within said casing and a metering chamber having side and end walls, a main inlet to said chamber and a main outlet therefrom in the end walls, auxiliary inlet and outlet openings in the end walls of said metering chamber, a fluid-impelled element in said chamber which approaches and recedes from such end walls in alternation, and pressure differential easing openings in said element in general alinement with said main and auxiliary openings.

14. A fluid meter, including registering and metering mechanism, a hinged lid over the registering mechanism, a projection at one side for hinge-mounting said lid, there being a bore extending downwardly and inwardly through said projection for the introduction of liquid about the registering mechanism, and a closure plug for said bore.

FREDERICK W. HANKS.